United States Patent
Kitani

(10) Patent No.: US 8,914,036 B2
(45) Date of Patent: Dec. 16, 2014

(54) COMMUNICATION TERMINAL PERFORMING POWER SAVE BY INACTIVATING WIRELESS COMMUNICATION FUNCTIONS

(75) Inventor: Mitsuhiro Kitani, Yokohama (JP)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 1420 days.

(21) Appl. No.: 12/261,756

(22) Filed: Oct. 30, 2008

(65) Prior Publication Data

US 2009/0111485 A1    Apr. 30, 2009

(30) Foreign Application Priority Data

Oct. 31, 2007    (JP) ................................. 2007-282786

(51) Int. Cl.
*H04W 24/00* (2009.01)
*H04W 52/02* (2009.01)
*H04W 48/18* (2009.01)
*H04W 64/00* (2009.01)

(52) U.S. Cl.
CPC .......... *H04W 48/18* (2013.01); *H04W 52/0245* (2013.01); *Y02B 60/50* (2013.01); *H04W 64/006* (2013.01)
USPC ................... 455/456.1; 455/435.2; 455/552.1; 455/67.11; 455/434

(58) Field of Classification Search
None
See application file for complete search history.

(56) References Cited

U.S. PATENT DOCUMENTS

| | | | |
|---|---|---|---|
| 6,813,503 B1 * | 11/2004 | Zillikens et al. | 455/457 |
| 2003/0119504 A1 * | 6/2003 | Rankin | 455/434 |
| 2006/0030270 A1 * | 2/2006 | Cheng | 455/67.11 |
| 2006/0035636 A1 * | 2/2006 | Pirila | 455/435.2 |
| 2006/0063560 A1 * | 3/2006 | Herle | 455/552.1 |
| 2006/0205371 A1 | 9/2006 | Kitani et al. | |
| 2006/0268336 A1 | 11/2006 | Sakaniwa et al. | |
| 2006/0270441 A1 | 11/2006 | Miyata | |
| 2007/0011503 A1 | 1/2007 | Kitani | |
| 2009/0061870 A1 * | 3/2009 | Finkelstein et al. | 455/435.2 |

FOREIGN PATENT DOCUMENTS

| | | |
|---|---|---|
| JP | H10-210548 | 8/1998 |
| JP | 2001-027531 | 1/2001 |
| JP | 2002-044729 | 2/2002 |
| JP | 2003 189365 | 7/2003 |
| JP | 2003 264500 | 9/2003 |
| JP | 2004-214875 | 7/2004 |
| JP | 2004 289756 | 10/2004 |
| JP | 2006-203325 | 8/2006 |
| JP | 2006-262175 | 9/2006 |
| JP | 2007-151012 | 6/2007 |

\* cited by examiner

*Primary Examiner* — Gerald Johnson
(74) *Attorney, Agent, or Firm* — Cozen O'Connor

(57) ABSTRACT

A communication terminal includes a first wireless unit for carrying out cellular communication, and a second wireless unit for carrying out WLAN communication. A control unit carries out a power save operation that inactivates the WLAN communication function of these wireless communication functions. Location information for access points accessible by WLAN communication is stored in the storage unit. The control unit calculates distances between access points and the communication terminal and determines whether or not the communication terminal is within communication range of any of the access points by matching location information for the communication terminal obtained by the GPS unit and location information for the access points stored in the storage unit. When the access point is within communication range, the control unit gives notification by outputting the signal strength via a display unit and the like according to the distance to the access point.

7 Claims, 12 Drawing Sheets

| NO. | ACCESS POINT ID | | LOCATION INFORMATION | | ... |
|---|---|---|---|---|---|
| | SSID | MAC | LATITUDE | LONGITUDE | ... |
| 1 | wlanap001 | 00:00:**:11:... | LAT. 31° 11' 21" N | LONG. 131° 12' 23" E | ... |
| 2 | wlanap002 | 00:**:00:1A:... | LAT. 32° 21' 31" N | LONG. 132° 45' 51" E | ... |
| 3 | wlanap003 | **:00:00:1D:... | LAT. 33° 31' 41" N | LONG. 133° 51' 12" E | ... |
| ... | ... | ... | ... | ... | ... |
| 10 | wlanap010 | 00:**:00:2A:... | LAT. 34° 45' 51" N | LONG. 134° 32' 23" E | ... |
| ... | ... | ... | ... | ... | ... |
| n | wlanap999 | 00:00:**:2D:... | LAT. 35° 12' 23" N | LONG. 135° 43' 34" E | ... |
| ... | ... | | ... | | |

COMMUNICATION TERMINAL PERFORMING POWER SAVE BY INACTIVATING WIRELESS COMMUNICATION FUNCTIONS

BACKGROUND OF THE INVENTION

1. Field of the Invention

The present invention relates to a communication terminal and recording medium, and particularly relates to a communication terminal and recording medium suited to a communication terminal having a plurality of wireless communication functions.

2. Description of the Related Art

Various methods such as cellular communication, wireless LAN (WLAN: Wireless Local Area Network), and infrared communication are well known as wireless access (wireless communication) methods. For example, the cellular method that is a wide area wireless access method such as CDMA (Code Division Multiple Access) features superior availability because of the large service area even if a terminal device travels with high speed. On the other hand, the local wireless access methods exemplified by WLAN, provides high-speed data transfer with low cost though the service area is smaller than that of the cellular methods.

Currently, services for communication terminals each having a plurality of wireless access means become popular. Particular note is being taken of communication terminals capable of selecting and utilizing the most appropriate communication method from the points of view of accessibility, cost performance, communication speed and the like as a result of being installed with wireless access methods of both wide area wireless access methods and local area wireless access methods. Such terminals are generally called as "dual mode terminals". In the related art, as disclosed, for example, in Unexamined Japanese Patent Application KOKAI Publication No. 2002-44729, a method for displaying RSSI (Received Signal Strength Indicator) by displaying antenna bar icons is typified, and the number of icons is the same as the number of the wireless access means in the device. In this case, it is necessary for all of the wireless access means to be in operation in order to notify the user of RSSI for all of the wireless access means.

However, since this method requires all of the wireless access means to be always active, it reduces the drive time of battery-driven devices such as mobile communication terminals because of extra power consumption during the stand-by state.

To overcome such a problem, most of the dual mode terminals generally employ a method that is disclosed, for example, in Unexamined Japanese Patent Application KOKAI Publication No. 2006-203325. That is, controlling WLAN unit to be in a sleep state when the WLAN function has not been used for a long time. According to such a timer-controlled operation, power consumption at the WLAN unit is reduced.

SUMMARY OF THE INVENTION

To save the power consumption in a dual mode terminal having a cellular communication function and a WLAN function, inactivating the WLAN function is a typical way, because chances to use the WLAN function are not always available. However, when the WLAN function is inactivated, it is not possible to display an RSSI for the WLAN because the WLAN function is in sleep mode. This means that, for example, "out of range" is displayed during a power save operation that inactivates the WLAN function, even if the terminal is in areas where the WLAN access is available. In this case, the user will not be aware of chances to use the WLAN function. As a result, the WLAN function will not be utilized effectively though it is a featuring function of the dual mode terminal.

In order to resolve the problems described above, it is an object of the present invention to provide a communication terminal and a computer-readable recording medium capable of both reducing power consumption and improving usability of a communication terminal having a plurality of wireless communication functions.

In order to achieve the above object, a communication terminal according to a first aspect of the present invention, is a communication terminal capable of utilizing a plurality of wireless communication functions comprising:

a power save unit that performs a power save operation by inactivating at least one of the plurality of wireless communication functions;

a location information obtaining unit that obtains location information for the communication terminal;

a target information obtaining unit that obtains location information for an access target of the wireless communication functions inactivated by the power save unit, a determining unit that determines whether the communication terminal is within a communication range of the access target based on the location information obtained by the location information obtaining unit and the location information obtained by the target information obtaining unit; and a notification unit that gives notification of signal strength for the inactivated wireless communication function based on determination results of the determining unit.

In order to achieve the above object, a communication terminal according to a second aspect of the present invention is a communication terminal capable of utilizing a plurality of wireless communication functions comprising:

a power save unit that performs a power save operation by inactivating at least one of the plurality of wireless communication functions;

a location information obtaining unit that obtains location information for the communication terminal;

a traveling distance calculating unit that calculates distance traveled by the communication terminal based on the location information obtained by the location information obtaining unit;

a communication unit that causes the wireless communication function inactivated by the power save unit to be activated temporarily activate according to the distance traveled by the communication terminal calculated by the traveling distance calculating unit and executes a communication operation using the temporarily activated wireless communication function; and a notification unit that gives notification of signal strength acquired by a communication operation by the communication unit.

In order to achieve the above object, a computer-readable recording medium according to a third aspect of the present invention is a computer-readable recording medium storing a program to be executed by a computer that controls a communication terminal capable of utilizing a plurality of wireless communication functions realizing:

a function that performs a power save operation by inactivating at least one of the plurality of wireless communication functions;

a function that obtains location information for the communication terminal;

a function that obtains location information for an access target of the inactivated wireless communication functions;

a function that determines whether the communication terminal is within a communication range of the access target based on the obtained location information for the communication terminal and the obtained location information for the access target; and a function that gives notification of signal strength for the inactivated wireless communication function based on the results of the determination.

In order to achieve the above object, a computer-readable recording medium according to a fourth aspect of the present invention is a computer-readable recording medium storing a program to be executed by a computer that controls a communication terminal capable of utilizing a plurality of wireless communication functions realizing:

a function that performs a power save operation by inactivating at least one of the plurality of wireless communication functions;

a function that obtains location information for the communication terminal;

a function that calculates distance traveled by the communication terminal based on the obtained location information;

a function that causes the inactivated wireless communication function to activate temporarily according to the calculated distance traveled by the communication terminal and executes a communication operation using the temporarily activated wireless communication function; and a function that gives notification of signal strength acquired by the communication operation by the temporarily activated wireless communication function.

According to the present invention, it is possible to improve usability of a communication terminal having plural types of wireless communication functions with reducing its power consumption.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of AP information obtained by the communication terminal shown in FIG. 1;

DETAILED DESCRIPTION OF THE PREFERRED EMBODIMENTS

First Embodiment

A communication terminal according to a first embodiment of the present invention will now be described with reference to the drawings. A communication terminal 100 according to the first embodiment of the present invention is a mobile communication terminal such as a mobile telephone. In this embodiment, the communication terminal 100 is a so-called "dual mode terminal". That is, in addition to a wireless communication function (first wireless communication function) that is a basic function for carrying out voice calls and data communication, the communication terminal 100 has another type of wireless communication function (second wireless communication function) being different from the first wireless communication function.

In this embodiment, the first wireless communication function may be a cellular communication function that carries out wireless access to a so-called cellular network. The second wireless communication function may be a WLAN (Wireless Local Area Network) function.

Figure 1:
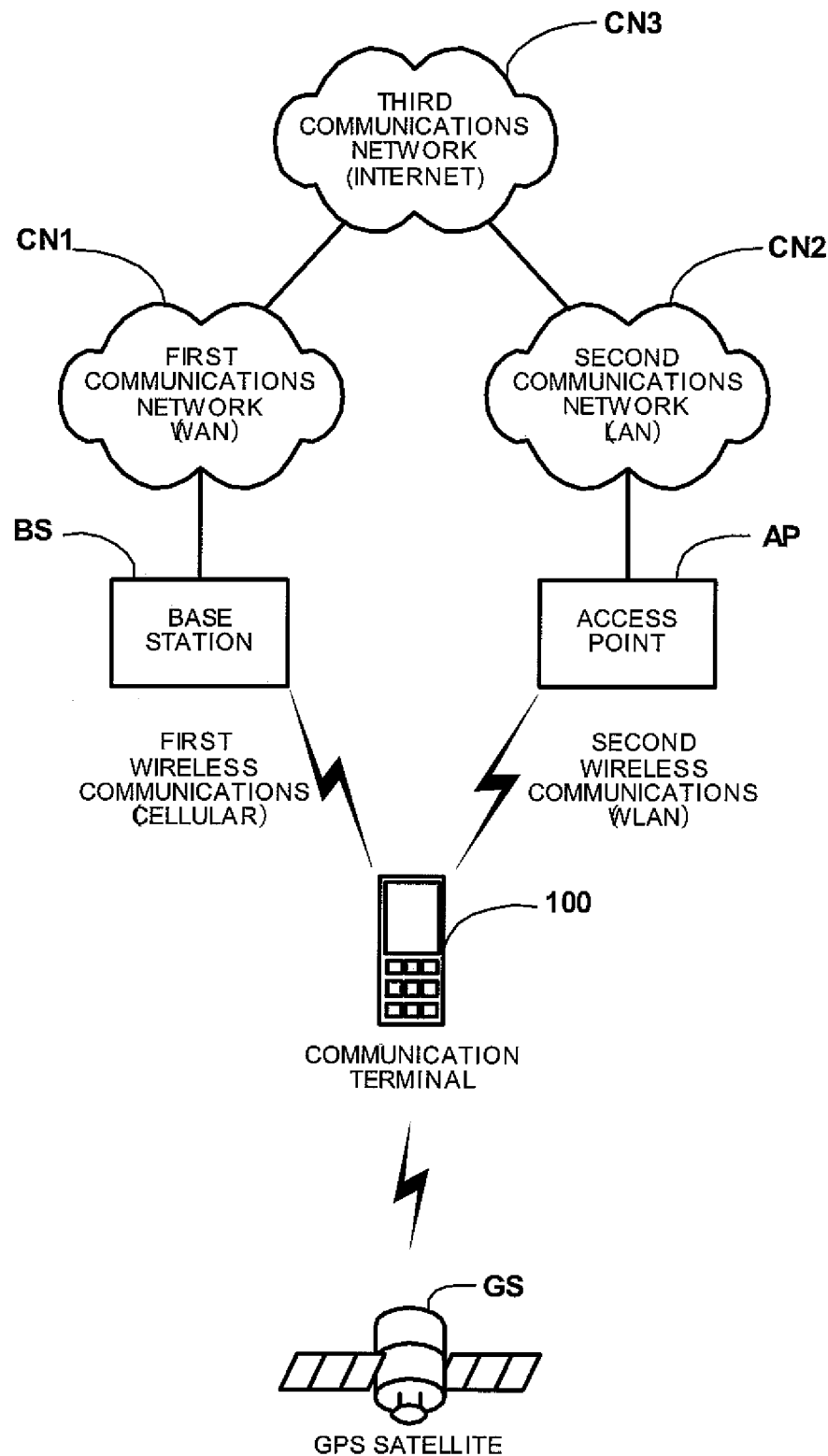
FIG. 1 is a diagram for explaining wireless communication to which a communication terminal according to embodiments of the present invention is applicable.

As shown in FIG. 1, the communication terminal 100 according to this embodiment is capable of connecting to a first communications network CN1 that is a WAN (Wide Area Network) such as a cellular network using the first wireless communication functions (cellular communication). And the communication terminal 100 is also capable of connecting to a second communications network CN2 such as a LAN (Local Area Network) using the second wireless communication functions (WLAN).

The first communications network CN1 and the second communications network CN2 may be connected to a third communications network CN3 such as the Internet. In this embodiment, it is possible to make a connection from the communication terminal 100 to the third communications network CN3 (Internet) via either the first communications network CN1 or the second communications network CN2 by interposing a prescribed gateway device or the like.

When connecting to the first communications network CN1 (cellular network), the communication terminal 100 carries out wireless access to base stations BS scattered by a mobile communications carrier. Namely, the base stations BS are access targets of the communication terminal 100 when the communication terminal 100 establishes the first wireless communication.

When the communication terminal 100 establishes a connection to the second communications network CN2 (LAN), the communication terminal 100 makes a wireless access to an access point AP being connected to the LAN (the second communications network CN2). The access points AP of this embodiment may be located, for example, at public facilities, shops and the like for providing services to connect to the Internet (third communications network CN3) using WLAN function in the terminal devices such as the communication terminal 100. Namely, the access points AP are access targets of the communication terminal 100 when the communication terminal 100 establishes the second wireless communication.

The communication terminal 100 of this embodiment also has a GPS (Global Positioning System) function for obtaining location information. As shown in FIG. 1, the communication terminal 100 receives GPS signals from a GPS satellite GS, and the communication terminal 100 obtains location information representing current location of the communication terminal 100.

Figure 2:
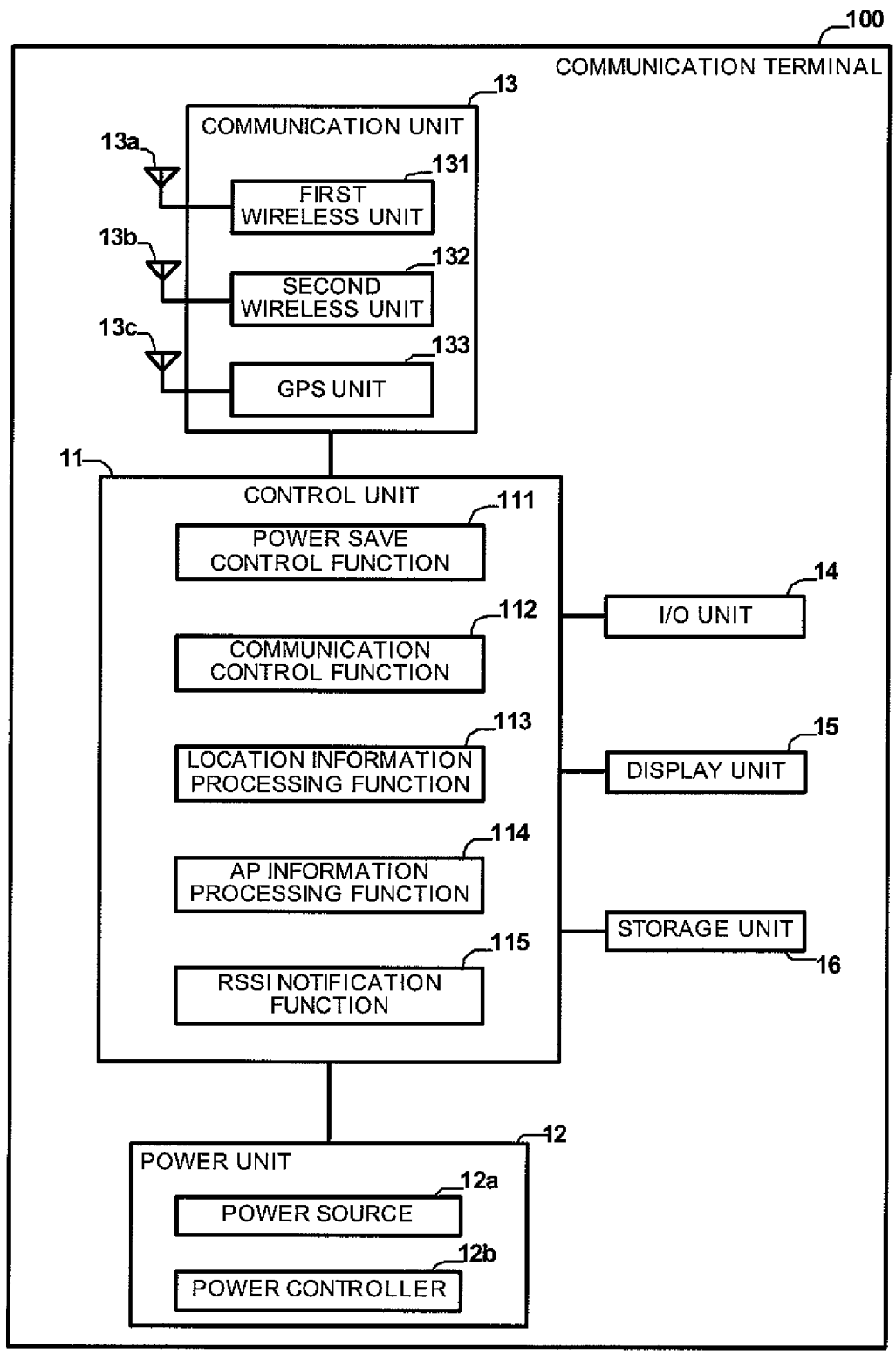
FIG. 2 is a block diagram showing an example configuration for the communication terminal shown in FIG. 1.

FIG. 2 shows a configuration for the communication terminal 100 having functions described above. As shown in FIG. 2, the communication terminal 100 may comprise a control unit 11, a power unit 12, a communication unit 13, an I/O (input/output) unit 14, a display unit 15, and a storage unit 16, etc.

The control unit 11 may be, for example, a CPU (Central Processing Unit) and controls the overall operation of the communication terminal 100 by executing operation programs stored in the storage unit 16 or the like.

The power unit 12 supplies electrical power necessary for driving each of the parts of the communication terminal 100 and may comprise a power source 12a, a power controller 12b, and the like.

The power source 12a may be a battery such as a lithium ion cell that accumulates electrical power necessary for driving electrical components in the communication terminal 100. The power source 12a may also be a power plug or the like that receives electricity from an outlet.

The power controller 12b may be a controller circuit that controls the destination of the electrical power supplied from the power source 12a based on instructions from the control unit 11. Under normal mode operation, electrical power is supplied to each of the elements in the communication terminal 100 during the communication terminal 100 is activated. While the communication terminal 100 is inactivated, minimum electrical power is supplied only to the limited elements necessary for standby mode operation. The communication terminal 100 of the present embodiment has power save mode. Under the power save mode operation, the power controller 12b controls power supply to certain components even if the communication terminal 100 is activated (turned on).

The communication unit 13 carries out operations for the wireless communication functions of the communication terminal 100. In this embodiment, the communication unit 13 includes a first wireless unit 131, a second wireless unit 132, a GPS unit 133, and the like.

The first wireless unit 131 may be a communication module for implementing the first wireless communication function of the communication terminal 100. In this embodiment, since the first wireless communication function adopts cellular communication, the first wireless unit 131 may comprise, for example, a wireless communication module, a modulation circuit, a demodulation circuit, and the like compatible with a wireless communication method such as CDMA (Code Division Multiple Access) adopted by the communication terminal 100.

Thus configured first wireless unit 131 carries out wireless transmission/reception via an antenna 13a being compatible with the adopted wireless communication method. Accordingly, the communication terminal 100 can establish the wireless communications with the base station BS connected to the first communications network CN1 (cellular network) as shown in FIG. 1.

The second wireless unit 132 may be a communication module for implementing the second wireless communication function of the communication terminal 100. In this embodiment, since the second wireless communication function is a WLAN function, the second wireless unit 132 includes a communication module, a modulation circuit, a demodulation circuit, and the like being compatible with typical WLAN standard such as IEEE802.11 series (IEEE802.11a, IEEE802.11b, IEEE802.11g, IEEE802.11n, etc.).

Thus structured second wireless unit 132 carries out wireless transmission/reception via an antenna 13b being compatible with the adopted wireless communication method. Accordingly, the communication terminal 100 can establish the wireless communications with the access point AP connected to the second communications network CN2 (LAN) as shown in FIG. 1.

The communication terminal 100 is therefore capable of selectively utilizing cellular communication which is advantageous to connectivity and availability over a wide area, or WLAN which is advantageous to data transfer speed with reasonable cost though connectivity and availability are disadvantageous. In this embodiment, the communication terminal 100 has two different types of the wireless access means (cellular and WLAN), however, the communication unit 13 may comprise three or more different types of wireless access means. Such an option allows a user to select appropriate one from various kinds of wireless access means, thus the usability may improve.

The GPS unit 133 may comprise, for example, a GPS communication circuit and the like, and obtains coordinate information etc. indicating the location of the communication terminal 100 by receiving GPS signals from the GPS satellite GS via a GPS antenna 13c as shown in FIG. 1.

The I/O unit 14 may comprise an operation unit including various keys and buttons to be operated by the user, a microphone and speaker for inputting and outputting audio for voice calls or the like, and signal processing circuits to carry out various input and output operations. The I/O unit 14 may also output audio such as for ring tones and alarms.

The display unit 15 comprises, for example, a display panel (an LCD panel, an organic EL panel, or the like), driver circuits and the like, to carry out display output based on image signals from the control unit 11. In this embodiment, the display unit 15 displays graphical indicators (icons or the like) for the RSSI (Received Signal Strength Indicator) of the wireless communication by the communication unit 13 in addition to the display of various images.

The storage unit 16 may be memory devices including, for example, a non-volatile memory such as a flash memory, RAM (Random Access Memory) and the like. The storage unit 16 functions as a work memory for the control unit 11 and stores operation programs executed by the control unit 11 as well as data and arithmetic expressions necessary for executing processing of the present invention.

In this embodiment, the control unit 11 executes the operation programs stored in the storage unit 16 to realize operations for indicating RSSI for the installed wireless communications means to the user, while performing wireless access operations under the power save mode. To realize such operations, the control unit 11 according to the present embodiment functions as a power save control function 111, a communication control function 112, a location information processing function 113, an AP information processing function 114, an RSSI notification function 115 and the like as shown in FIG. 2.

The power save control function 111 exerts control so that the communication unit 13 operates in power save mode by controlling the power unit 12 and providing an instruction to change the operating state of the communication function. For example, if communication using the second wireless unit 132 does not take place for a fixed period of time while the second wireless unit 132 performs WLAN association with a nearby access point AP and awaits data communication, the power controller 12b is instructed to suspend the supply of electrical power to the second wireless unit 132.

The control operations by the power save control function 111 will now be described. In this embodiment, a power save operation is realized by controlling some of the wireless communication operations in the communication terminal 100 (dual mode terminal) to go into a sleep state.

As described above, the communication terminal 100 of this embodiment includes a first wireless communication function for carrying out cellular communication and a second wireless communication function for carrying out WLAN communication. In this case, when the communication terminal 100 operates in power save mode, the second wireless communication function is put into a sleep state. That is, having the second wireless communication function always active is not effective for power saving, because the areas where WLAN access is available appear locally and each of them is narrower than the cellular area.

In this event, the power save control function 111 controls the power controller 12b to restrict the supply of electrical power to the second wireless unit 132 so as to control the second wireless communication function to go into a sleep state in which the second wireless communication function is stopped. As a result, supply of electrical power to whole of the communication unit 13 is suppressed and it is possible to reduce the power consumption of the power source 12a which the power unit 12 has.

The communication control function 112 controls the communication unit 13 to control the wireless communication function of the communication terminal 100. In this embodiment, since the communication terminal 100 includes the first wireless communication function that is cellular communication and the second wireless communication function that is WLAN communication, the communication control function 112 controls the first wireless unit 131 and the second wireless unit 132 to carry out wireless communication processing.

The location information processing function 113 carries out processing on location information representing the location of the communication terminal 100. Since the communication terminal 100 of this embodiment includes a GPS function, the location information processing function 113 controls the GPS unit 133 to obtain location information of the communication terminal 100. The location information in this case may include the latitude and longitude of the current location of the communication terminal 100.

The AP information processing function 114 carries out processing of information about access points AP (AP information). The AP information includes information about the access points AP that are wirelessly accessible by the communication terminal 100 with using the second wireless communication function. In this embodiment, information about a plurality of access points AP is stored in the storage unit 16 as default, and the AP information processing function 114 obtains the AP information from the storage unit 16.

An example of the AP information stored in the storage unit 16 will now be described with reference to FIG. 3. As shown in the drawing, AP information 200 may be prepared in a relational database format and includes access point IDs as primal keys. The access point ID is a unique ID for each of the access points AP, thus the records in the table are uniquely identifiable by the primal key. In this embodiment, records 1 to n are prepared in the table, and each of the records stores location information of the corresponding access point AP.

The "access point ID" in this case may be, for example, SSID (Service Set IDentifier), MAC (Media Access Control) address, or the like uniquely allocated to each of the access points AP.

The "location information" is information including the latitude and longitude representing the locations of the access points AP.

This AP information 200 may be obtained, from a service provider of public WLAN access service or the like, by the manufacturer of the communication terminal 100 to preset it in the communication terminal 100 by registering the obtained information in the storage unit 16 at the time of manufacture of the communication terminal 100.

The RSSI notification function 115 carries out processing to notify the user of the RSSI for a wireless communication function that is put into a sleep state by the power save mode (in this embodiment, the second wireless communication function WLAN). When the WLAN function is in a sleep state, it cannot carry out normal RSSI receiving because communication with an access point AP is not taking place. To realize RSSI notification even if the WLAN function is in a sleep state, the RSSI notification function 115 uses the AP information 200 stored in the communication terminal 100 and the location information obtained by the GPS function, to notify the user of the RSSI without performing wireless communication with the access point AP.

In this embodiment, each of the above functions are realized logically as a result of the control unit 11 executing a program. However, each of the functions may be implemented using hardware such as, for example, an ASIC (Application Specific Integrated Circuit).

The above is the configuration for the communication terminal 100 necessary for realizing the present invention. However, other configurations required for functioning as a mobile communication terminal can also be included as appropriate. For example, it is also possible to include a structure for a vibrator function that informs a user of notices by vibration instead of sounds.

The operation of the communication terminal 100 will now be described below. First, the "Power Save Processing (1)" to be executed while the communication terminal 100 of this embodiment is in power save mode will now be described with reference to the flowchart shown in FIG. 4. This "Power Save Processing (1)" starts at timings where the communication terminal 100 goes into power save mode.

In addition to the case where the communication terminal 100 goes into the power save mode by instruction from a user, the timing of the activation of the power save mode may also correspond to, for example, a case such as where WLAN communication is not established for a long time.

That is, the power save control function 111 of the control unit 11 enters into (activates) the power save mode when the processing starts in response to appearance of start trigger (step S111). In this event, the power save control function 111 controls the power controller 12b of the power unit 12 to restrict the supply of electrical power to the second wireless unit 132 of the communication unit 13, thus the second wireless communication function (WLAN function) is put into sleep mode.

When the WLAN function is put into sleep mode in this manner, wireless communication with an access point AP is not established. Therefore, the communication terminal 100 cannot calculate the RSSI for the WLAN communication with an access point AP even if the access point AP is close to the communication terminal 100. In this case, the communication terminal 100 carries out RSSI notification for the WLAN without establishing WLAN communications.

Generally, the RSSI is periodically updated in order to give accurate notification of RSSI for the WLAN. In this embodiment, the time of the activation of the power save mode is taken to be the timing of the first update. The update timing from thereon is then times where a prescribed time elapses from the previous update time.

Since the RSSI update timing is reached as a result of the activation of power save mode at step S111 (step S112: Yes), the location information processing function 113 of the control unit 11 then controls the GPS unit 133 to obtain location information representing the current location of the communication terminal 100 (step S113). The obtained location information is then stored in the storage unit 16.

After the location information is obtained, the storage unit 16 is accessed by the AP information processing function 114 of the control unit 11, and the AP information processing function 114 obtains the stored AP information 200 as shown in FIG. 3 (step S114).

Figure 5:
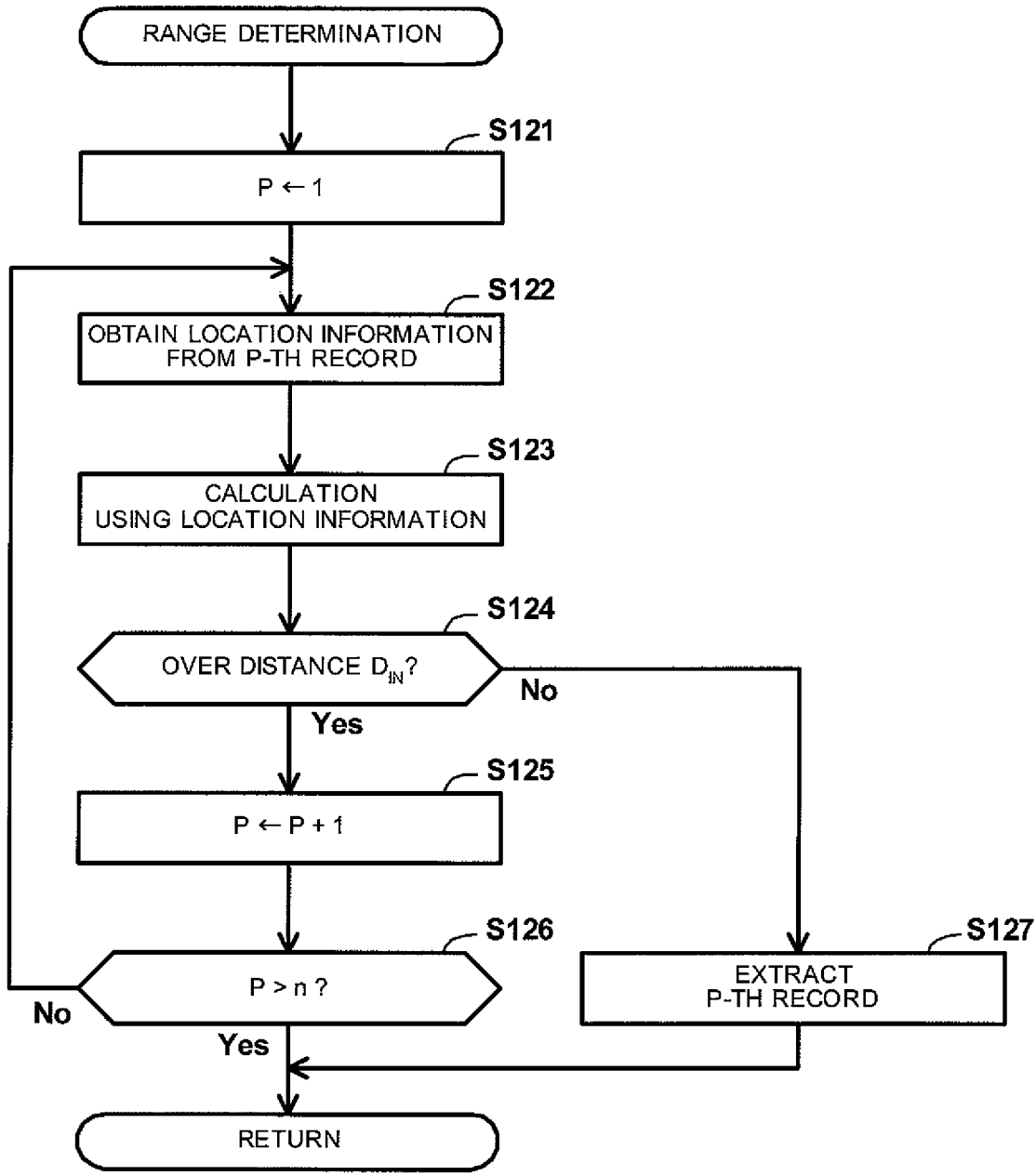
FIG. 5 is a flowchart for explaining "Range Determination" executed in the processing shown in FIG. 4.

The location information and the AP information are obtained, and thus the communication terminal 100 uses the obtained information to determine whether the communication terminal 100 is within the communication range of the WLAN. In this case, the processing of "Range Determination" is then executed by the RSSI notification function 115 of the control unit 11 (step S120). The "Range Determination" will now be described with reference to the flowchart shown in FIG. 5.

As the processing starts, the RSSI notification function 115 sets an initial value 1 at a pointer P for sequentially designating records of the AP information 200 (step S121). Location information for an access point AP registered in the P-th (No. P) record is then obtained (step S122).

The RSSI notification function 115 determines whether or not the communication terminal 100 is within the communication range of the access point AP by carrying out calculation using the location information for the designated access point AP and the location information indicating the current location of the communication terminal 100 (step S123).

In this case, the RSSI notification function 115 calculates the following equation 1. Here, "LT" indicates the latitude of the current location of the communication terminal 100 and "LG" indicates the longitude of the current location of the communication terminal 100. Further, "$LT_P$" indicates the latitude of the P-th access point AP and "$LG_P$" indicates the longitude of the P-th access point AP. "$D_{IN}$" is the maximum value of the distance from the access point AP for which wireless access is possible (i.e. the radius of the communication range covered by the access point AP).

$$(LT-LT_P)^2 + (LG-LG_P)^2 \leq (D_{IN})^2 \qquad \text{Equation 1}$$

When equation 1 is satisfied, the access point AP is within the distance $D_{IN}$ from the communication terminal 100. Namely, the current location of the communication terminal 100 is determined to be within a range where communication with the designated access point AP is possible.

On the other hand, when equation 1 is not satisfied, the access point AP is not within a distance $D_{IN}$ from the communication terminal 100. Namely, the current location of the communication terminal 100 is determined to be outside of a range where communication with the designated access point AP is possible.

When equation 1 is not satisfied for the access point AP registered in the P-th record of the AP information 200, it is determined that the communication terminal 100 is not within the range of the distance $D_{IN}$ from the access point AP concerned (step S124: Yes). In this case, the RSSI notification function 115 designates the next record by incrementing the pointer P by +1 (step S125).

In this event, if the number after incrementing is equal to n or less (step S126: No), the processing of step S122 to step S124 is carried out for the newly designated P-th access point AP.

On the other hand, when equation 1 is satisfied for the P-th access point AP, it is determined that the communication terminal 100 is within the range of the distance $D_{IN}$ from the access point AP (step S124: No). In this case, the RSSI notification function 115 extracts information from the P-th record of the AP information 200 (step S127), and the processing ends.

Namely, the RSSI notification function 115 carries out successive matching processing as to whether or not there is an accessible access point AP near (within the distance $D_{IN}$) the communication terminal 100 based on the location information for the access point AP registered in the AP information 200 and the location information for the communication terminal 100. If a matched access point AP is found, the RSSI notification function 115 obtains information for this access point AP.

In this case, if none of the access points AP registered in the AP information 200 are near the communication terminal 100, the processing will end after matching for all of the records is completed (step S126: Yes). Or, if an access point AP near the communication terminal 100 is found (step S124: No, step S127), the processing ends at that point even before completing the matching.

Figure 4:
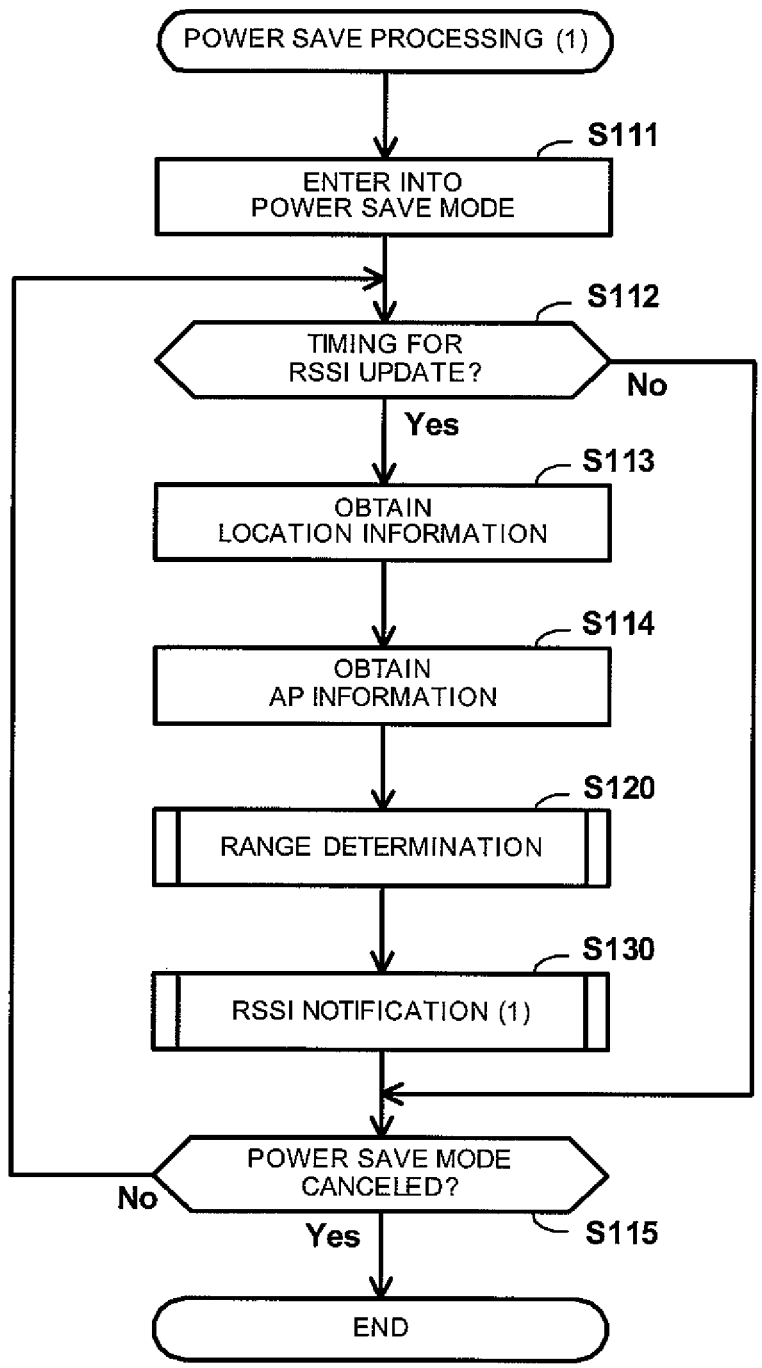
FIG. 4 is a flowchart for explaining "Power Save Processing (1)" according to a first embodiment of the present invention.
Figure 6:
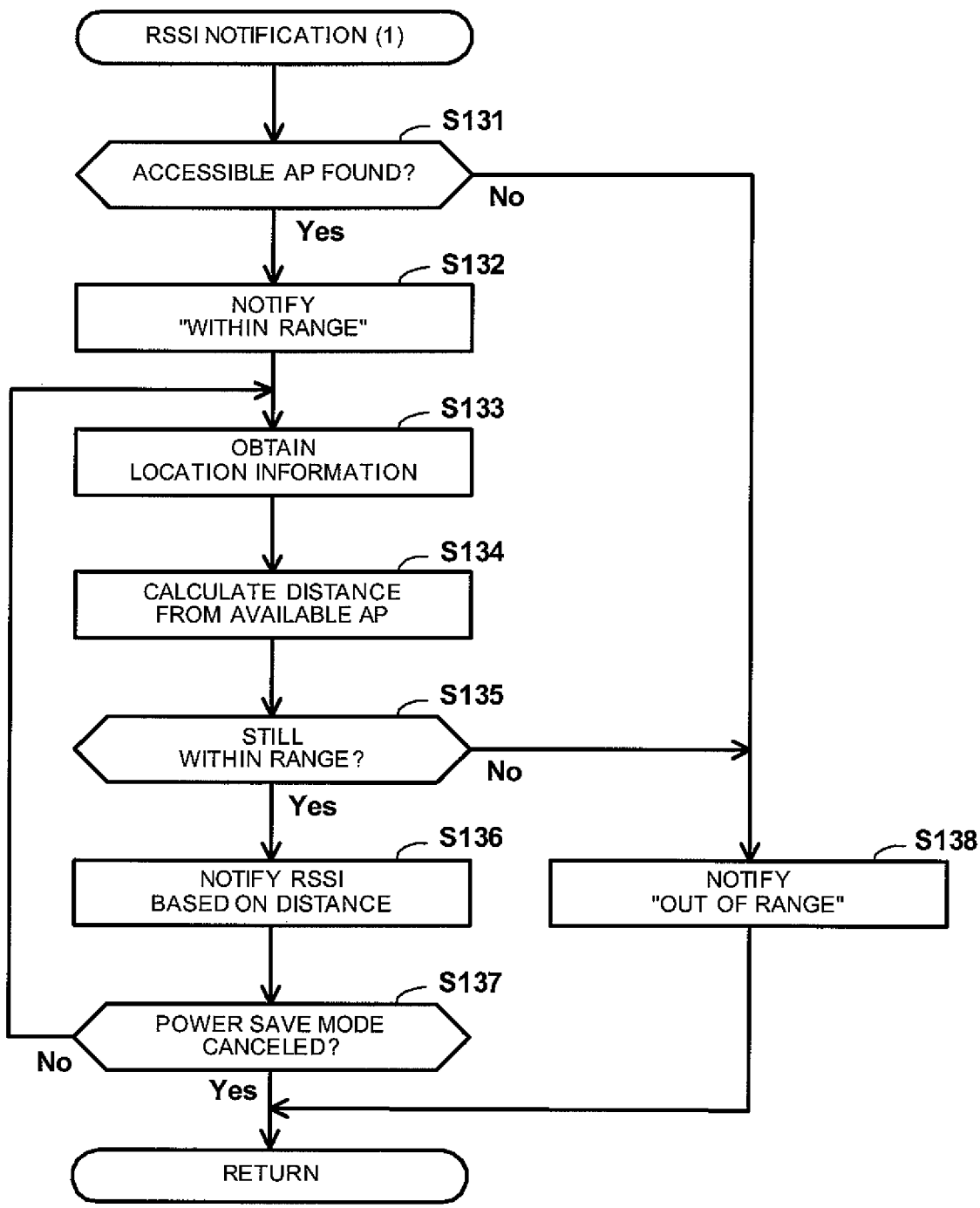
FIG. 6 is a flowchart for explaining "RSSI Notification (1)" executed in the processing shown in FIG. 4.

When the "Range Determination" ends, the process flow goes back to the "Power Save Processing (1)" shown in FIG. 4. In this event, the processing of "RSSI Notification (1)" is executed in order to give notification of the RSSI based on the determination results of the "Range Determination" (step S130). The "RSSI Notification (1)" will now be described with reference to the flowchart shown in FIG. 6.

When processing starts, the RSSI notification function 115 determines whether or not there is an access point AP at an accessible distance from the communication terminal 100 based on the processing results for the "Range Determination" (FIG. 5) (step S131). Hereinafter, such the access point AP will be referred to as "available access point AP".

Figure 7A:
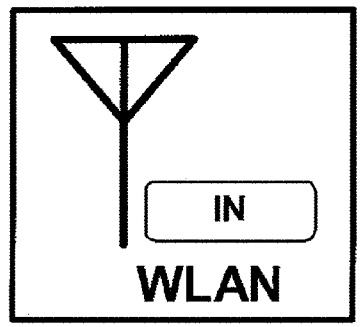
FIG. 7A is a diagram exemplifying an RSSI display when the communication terminal is within range of communication with an access point.

If an available access point AP is present (step S131: Yes), the RSSI notification function 115 controls the output component (the display unit 15 and the like) to notify the user that the communication terminal 100 is "within range" for WLAN access (step S132). FIG. 7A shows an example of an RSSI display indicating that the communication terminal 100 is "within range".

Figure 7B:
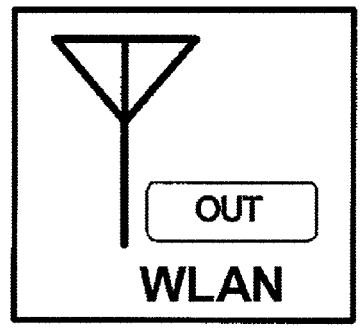
FIG. 7B is a diagram exemplifying an RSSI display when the communication terminal is out of range of communication with an access point.

On the other hand, when there is no available access point AP (step S131: No), the RSSI notification function 115 controls the output component (the display unit 15 and the like) to notify the user that the communication terminal 100 is "out of range" for WLAN access (step S138), and the processing ends. In this case, the process flow goes back to "Power Save Processing (1)" shown in FIG. 4. FIG. 7B shows an example of an RSSI display indicating that the communication terminal 100 is "out of range".

If the communication terminal 100 is "within range", the location information processing function 113 controls the GPS unit 133 to obtain location information indicating the current location of the communication terminal 100 (step S133), and the RSSI notification function 115 calculates the distance to the available access point AP (step S134).

That is, the RSSI notification function 115 calculates the left side of the equation 1 using the location information for the available access point AP extracted in step S127 of the "Range Determination" (FIG. 5) and the location information for the communication terminal 100 obtained in step S133. Thus, the distance between the communication terminal 100 and the available access point AP is calculated.

If the RSSI notification function 115 determines that the communication terminal 100 is still "within range" at this point in time based on the calculated distance (step S135: Yes), the RSSI notification function 115 carries out RSSI notification corresponding to this distance (step S136).

That is, the RSSI notification function 115 performs the notification based on the calculated distance by which the user can recognize the RSSI level. In this event, for example, a predetermined threshold value for the distance to the available access point AP is set, and the RSSI notification function 115 refers to the threshold value to determine the RSSI level.

Figure 7C:
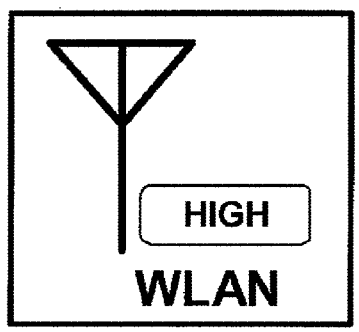
FIG. 7C is a diagram exemplifying a display when an RSSI level is high.

For example, if the calculated distance to the available access point AP is shorter than the threshold distance, the RSSI notification function 115 displays an RSSI display as shown in FIG. 7C indicating that the RSSI level is high.

Figure 7D:
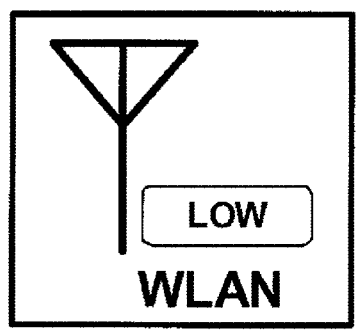
FIG. 7D is a diagram exemplifying a display when an RSSI level is low.

On the other hand, if the calculated distance to the available access point AP is longer than the threshold distance, the RSSI notification function displays an RSSI display as shown in FIG. 7D indicating that the RSSI level is low.

Figure 7E:
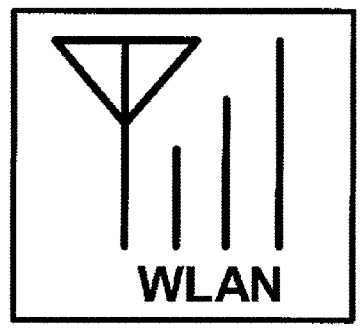
FIG. 7E is a diagram showing another example of a RSSI level display.

Alternatively, the RSSI level may be expressed by a number of antenna bars as shown in FIG. 7E.

In this way, even if the WLAN function is put to a sleep state under the power save mode, the communication terminal 100 can notify the user that WLAN access is available if it is determined that the communication terminal 100 is "within range". While the communication terminal 100 is "within range", the communication terminal 100 also can notify change of the RSSI level.

In the case of giving "within range" notification in step S132, and in the case of carrying out RSSI notification according to distance in step S136, the notification is not limited to the graphical display exemplified in FIGS. 7A, 7C to 7E, and it may be done by audio output by the I/O unit 14 or vibration. According to these options, it is then possible for the user to be notified that it is possible to use the WLAN even without looking at the display unit 15.

When the user performs an operation to utilize the WLAN function as a result of this notification, the second wireless unit 132 is activated and the power save mode is canceled.

When the power save mode is canceled in this way (step S137: Yes), this processing ends and the process flow goes back to the "Power Save Processing (1)" (FIG. 4).

On the other hand, if the power save mode is maintained (step S137: No), an operation for giving notification of the RSSI level according to changes in distance is repeated by returning to step S133 and obtaining location information constantly (step S133 to step S136). Then, the processing ends if the power save mode is canceled (step S137: Yes) or the distance based RSSI turns to "out of range" (step S135: No, step S138), and the process flow goes back to the "Power Save Processing (1)" (FIG. 4).

In the "Power Save Processing (1)" (FIG. 4), after the "RSSI Notification (1)", it is determined whether the power save mode is cancelled or not (step S115).

If power save mode has been cancelled by a user operation to activate the WLAN function (step S115: Yes), the processing ends and other processing to perform communication using the WLAN is executed.

On the other hand, if ending of the "RSSI Notification (1)" (FIG. 6) is not because of cancellation of the power save mode (step S115: No), the process flow goes back to step S112, and the processing described above is then executed at every timings for RSSI update until the power save mode will be cancelled (step S112 to step S114, step S120, step S130).

As a result of the above processing, it is possible to notify the user of the RSSI for second wireless communication even when the second wireless unit 132 is inactivated under power save mode and the second wireless communication is not established. It is therefore possible to improve usability to use the second wireless communication (WLAN) function.

The display screen for giving RSSI notification is not limited to the icon display as shown in FIG. 7A to FIG. 7E, and arbitrary display methods may be applicable. For example, a pseudo RSSI notification may be achieved by displaying the distance to the available access point AP using a numeric value. If each of the communication methods employs different unit for indicating RSSI, an additional calculation may be taken place before displaying RSSI in order to notify the user of RSSI by common unit. An example of calculation is to correct RSSI values so as to be in a certain range as a result of multiplication with a correction value $\alpha$ (where $\alpha$ is an arbitrary constant). Another example is to extract an average value for a fixed time from a certain time in the past to a current time.

When the operation mode of the communication terminal 100 is not power save mode, the second wireless unit 132 acquires WLAN signals. In this case, RSSI will be calculated based on the acquired WLAN signals, therefore, the RSSI notification unit 115 notifies thus calculated RSSI. Format of RSSI may be uniformed between the normal mode and the power save mode (for example, displaying antenna bars as shown in FIG. 7E). As a result, it is possible to give notification of the RSSI without the user being made aware of differences in the operation modes of the communication terminal 100.

On the other hand, when power save mode is in operation, it is sufficient to supply just a minimum of information as to whether a WLAN access is available or not to the user. This means that only notifications of "within range" or "out of range" are carried out and notifications of changes in the RSSI level do not have to be carried out.

As describe above, according to the communication terminal 100 of the first embodiment, it is possible to carry out appropriate RSSI notification even when a wireless communication function is inactivated by a power save operation, by determining whether or not the communication terminal 100 is within an accessible area based on the location information of the communication terminal 100 and an available wireless access (access point).

Second Embodiment

According to the first embodiment, RSSI notification for an inactivated wireless communication function in a sleep state is realized by using the AP information 200 stored in the storage unit 16 of the communication terminal 100.

However, the access points AP realizing the public WLAN services and the like may be newly established or may have become disused. Since the AP information 200 was prepared at the time when the communication terminal 100 was manufactured, appropriate RSSI notification may not be maintained without updating the AP information 200.

If it is possible to update the AP information 200 stored in the storage unit 16 flexibly in accordance with actual status of the access points AP, it is able to maintain appropriate RSSI notification. In this embodiment, an example for updating the AP information 200 will now be described.

Here, examples are shown for processing for updating the AP information 200 at the time when the WLAN function is activated, and processing for updating the AP information 200 at the time when the GPS function obtains location information.

Figure 8:
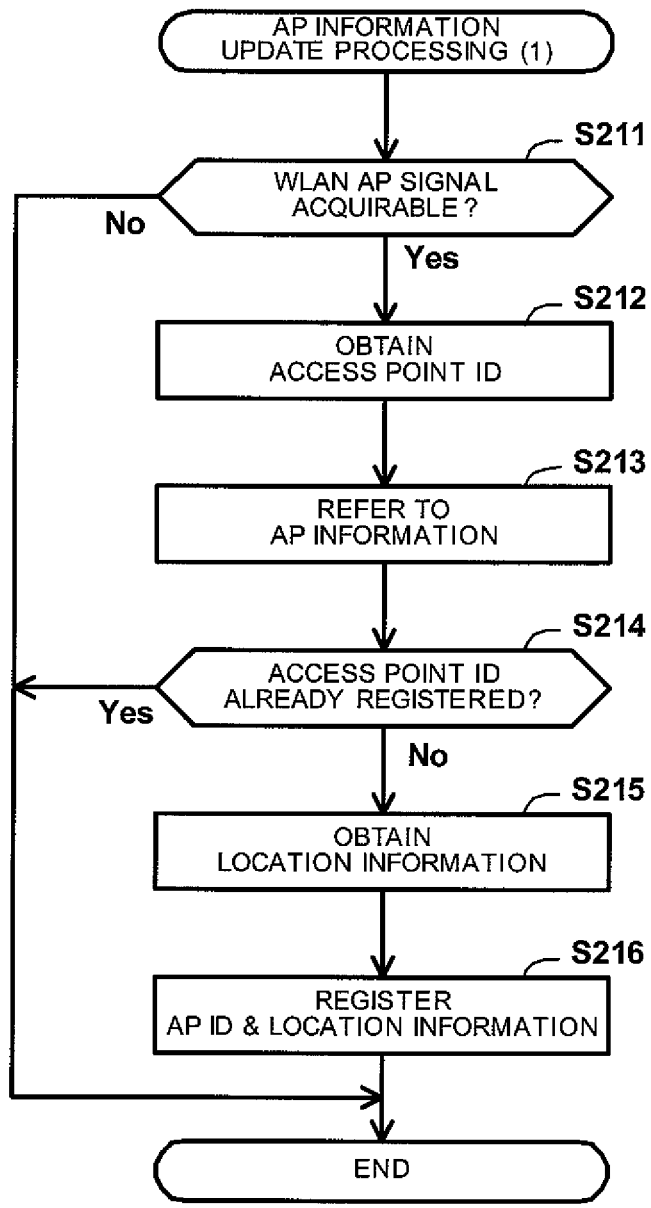
FIG. 8 is a flowchart for explaining "AP Information Update Processing (1)" according to a second embodiment of the present invention.

First, an explanation is given with reference to the flowchart shown in FIG. 8 of "AP Information Update Processing (1)" for updating the AP information 200 at the time when the WLAN function is activated. This "AP Information Update Processing (1)" starts, for example, when the second wireless unit 132 is activated (started up) in order to initialize each unit just after the communication terminal 100 is turned on, or when cancellation of the power save mode causes activation of the second wireless unit 132, or the like.

When the processing starts immediately upon the second wireless unit 132 (i.e. WLAN function) being activated, the communication control function 112 controls the second wireless unit 132 to start a signal acquisition operation.

Generally, the access point AP for WLAN communication constantly transmits beacon signals in order to notifying its SSID and the like. Namely, since the access point AP always transmits signals (hereinafter, referred to as "WLAN AP signal"), the activated second wireless unit 132 can acquire WLAN AP signal if there is an access point AP near the communication terminal 100. Hereinafter, such the access point AP near the communication terminal 100 will be referred to as "nearby access point AP".

When the WLAN AP signal is acquired (step S211: Yes), the AP information processing function 114 obtains an access point ID such as an SSID in the beacon signal acquired by the second wireless unit 132 (step S212).

Thus the access point ID for the nearby access point AP is obtained, the AP information processing function 114 refers to the AP information 200 stored in the storage unit 16 (step S213) and determines whether or not the obtained access point ID is already registered in the AP information 200 (step S214).

If the access point ID of the nearby access point AP is already registered in the AP information 200 (step S214: Yes), the processing ends because it is not necessary to update the AP information 200.

On the other hand, if the access point ID of the nearby access point AP is not registered in the AP information 200 (step S214: No), the location information processing function 113 controls the GPS unit 133 to obtain location information indicating the current location of the communication terminal 100 (step S215).

The AP information processing function 114 then makes a new record in the table constituting the AP information 200 as shown in FIG. 3, registers the access point ID obtained in step S212 and the location information obtained in step S215 in the newly added record (step S216), and the processing ends. In other words, the access point ID and the location information of the access point AP from which signals can actually be acquired are added to the AP information 200.

As a result of this processing, even when access points AP are newly established after the AP information 200 was preset in the communication terminal 100, it is possible to add information about such newly established access points AP to the AP information 200 flexibly. It is therefore possible to carry out appropriate RSSI notification corresponding to actual up-to-date status of the access points AP.

Figure 9:
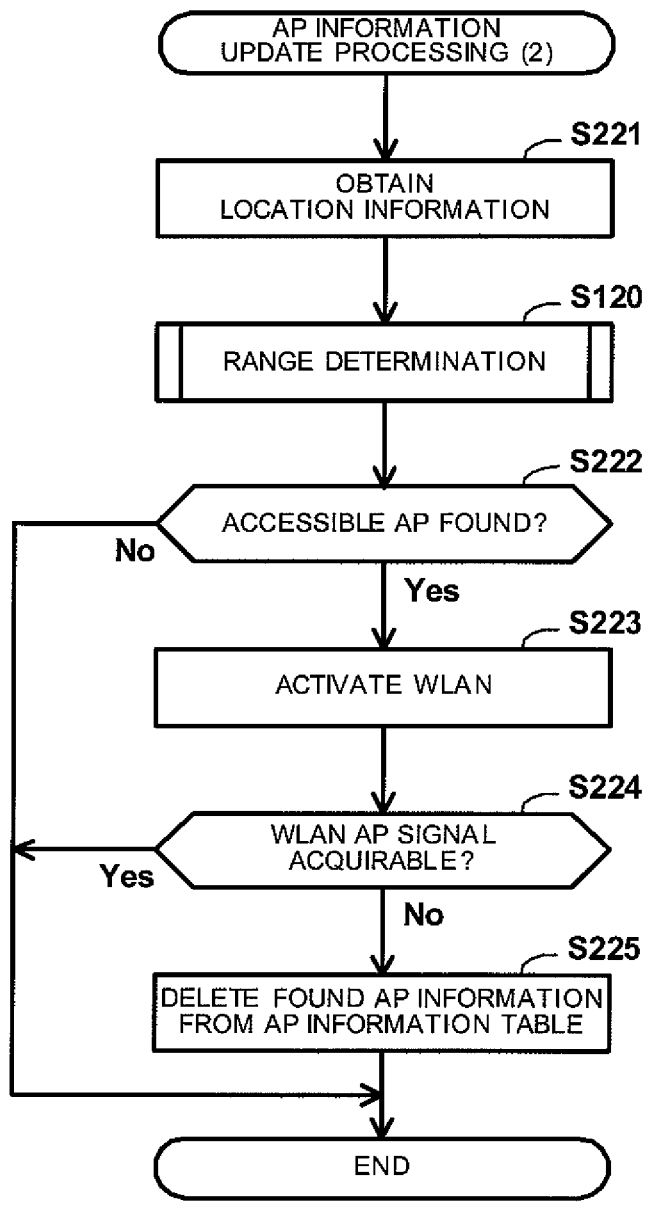
FIG. 9 is a flowchart for explaining "AP Information Update Processing (2)" according to the second embodiment of the present invention.

Next, an explanation is given with reference to the flowchart shown in FIG. 9 of "AP Information Update Processing (2)" which performs update of the AP information 200 at the time when the communication terminal 100 obtains the location information. This "AP Information Update Processing (2)" starts, for example, when the GPS unit 133 is activated for the initialization of other components just after the communication terminal 100 is turned on, or at the time of obtaining the location information in each process exemplified in the first embodiment, or the like.

When the processing starts, the location information processing function 113 controls the GPS unit 133 to obtain location information indicating the current location of the communication terminal 100 at this time (step S221).

After the location information of the communication terminal 100 is obtained, the processing of "Range Determination" (see FIG. 5) exemplified in the first embodiment is executed by the RSSI notification function 115 (step S120).

If it is determined that any of the access points AP currently registered in the AP information 200 are within accessible distance based on the processing results for the "Range Determination" (step S222: Yes), the communication control function 112 controls the second wireless unit 132 to activate the WLAN function (step S223).

Namely, when it is determined that there is an access point AP near to the communication terminal 100 (that is, nearby access point AP) based on the AP information 200, the WLAN function is activated. If the access point AP registered in the AP information 200 actually exists, the communication terminal 100 can acquire a signal emitted by this access point AP by the activation of WLAN (step S224: Yes). In this event, the processing ends because it is not necessary to update the AP information 200.

On the other hand, if a signal cannot be acquired though it is determined that there is a nearby access point AP based on the AP information 200 (step S224: No), the AP information processing function 114 deletes the record for the access point AP concerned from the AP information 200 (step S225), and the processing ends.

This is, in a case where the nearby access point AP whose information has been registered in the AP information 200 is not available actually, the access point ID and location information of the access point AP concerned are deleted from the AP information 200.

According to such processing, even if access points AP are discarded after the AP information 200 was preset in the communication terminal 100, information for such access points AP is deleted flexibly from the AP information 200. It is therefore possible to carry out appropriate RSSI notification corresponding to actual up-to-date status of the access points AP.

As a result of carrying out the above processing, the AP information 200 stored in the storage unit 16 is always up to date and appropriate RSSI notification can be carried out.

In this event, operations to update the AP information 200 take place when the WLAN operation or the GPS operation happens to begin occasionally. That is, the operations for updating AP information 200 do not require extra power consumption. Therefore, it realizes both appropriate RSSI notification with effective power saving.

Third Embodiment

In the first and second embodiments, the AP information 200 is stored in advance in the communication terminal 100 and is then utilized to carry out RSSI notification.

However, if the number of utilizable access points AP becomes huge, the amount of information for the AP information 200 also becomes large. This raises the problems that storage of the AP information 200 in the storage unit 16 is no longer possible and the time taken for matching becomes substantial.

To overcome these problems, the AP information 200 may be obtained from outside of the communication terminal 100 without storing the AP information 200 in the communication terminal 100 to enable RSSI notification.

Figure 10:
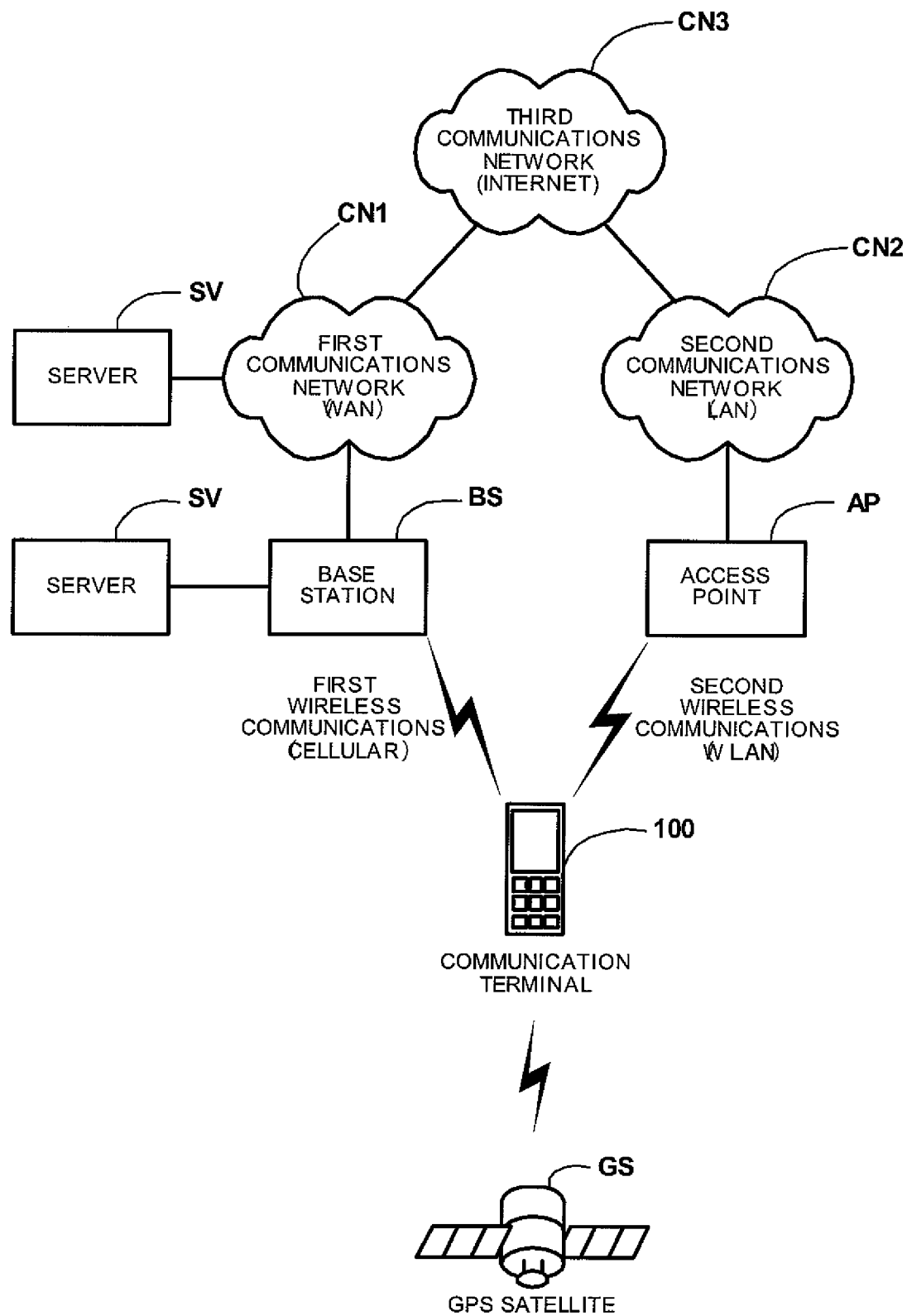
FIG. 10 is a diagram illustrating a system configuration according to a third embodiment of the present invention.

In this case, for example, as shown in FIG. 10, a server SV supplying the AP information 200 to the communication terminal 100 may be connected to the first communications network CN1 or to a base station BS.

This server SV stores the AP information 200 as shown in FIG. 3 in its storage device such as a hard disk device, and supplies the AP information 200 in response to requests from communication devices such as the communication terminal 100.

Since the server SV is connected to the first communications network CN1 or to the base station BS, the communication terminal 100 uses the first wireless communication for making a request to the server SV for the AP information 200.

Namely, the AP information 200 required for notification of the RSSI of the second wireless communication (WLAN) being inactivated by the power save operation will be acquired using the first wireless communication (cellular communication) different from the second wireless communication.

As a result, it is not necessary for activating the WLAN function in order to obtain the AP information 200. It is therefore possible to obtain the AP information 200 even in power save mode.

To realize the operation for this embodiment, just modify step S114 of the "Power Save Processing (1)" (FIG. 4) exemplified in the first embodiment so that the location information processing function 114 operates to obtain the AP information 200 from the server SV.

As an additional operation, the communication terminal 100 may obtain location information by the GPS function and informs the server SV of the location information when the communication terminal 100 requests the AP information 200. In this case, the server SV can extracts information about the access points AP around current location of the communication terminal 100 based on the location information of the communication terminal 100. According to such an operation, the data amount of the AP information 200 to be transferred to the communication terminal 100 will be reduced. As a result, the communication time for transferring the AP information 200 is also reduced. The reduced AP information 200 also helps to improve throughput for the matching processing in the communication terminal 100.

If the communication terminal 100 has short-distance wireless communication means such as, for example, an infra-red communication function, Bluetooth, and RFID (Radio Frequency IDentification), it is also possible to use these wireless communications means to obtain the AP information 200 from an accessible communication device existing near to the communication terminal 100. In other words, the communication method used to obtain the AP information 200 is not limited to the exemplified ones above, and arbitrary communication method may be applicable if only it is possible to obtain the AP information 200 without using the wireless communication function to be inactivated under the power saving operation.

Fourth Embodiment

In each of the above embodiments, to carry out the RSSI notification, it is required to obtain the location information of the access points AP.

However, if the server SV as described in the third embodiment which provides the AP information 200 is not available and the communication terminal 100 does not have the AP information 200 in its storage, the RSSI notification cannot be carried out.

This embodiment will exemplify a method for realizing the RSSI notification for an inactivated wireless communication means without using the AP information 200.

Figure 11:
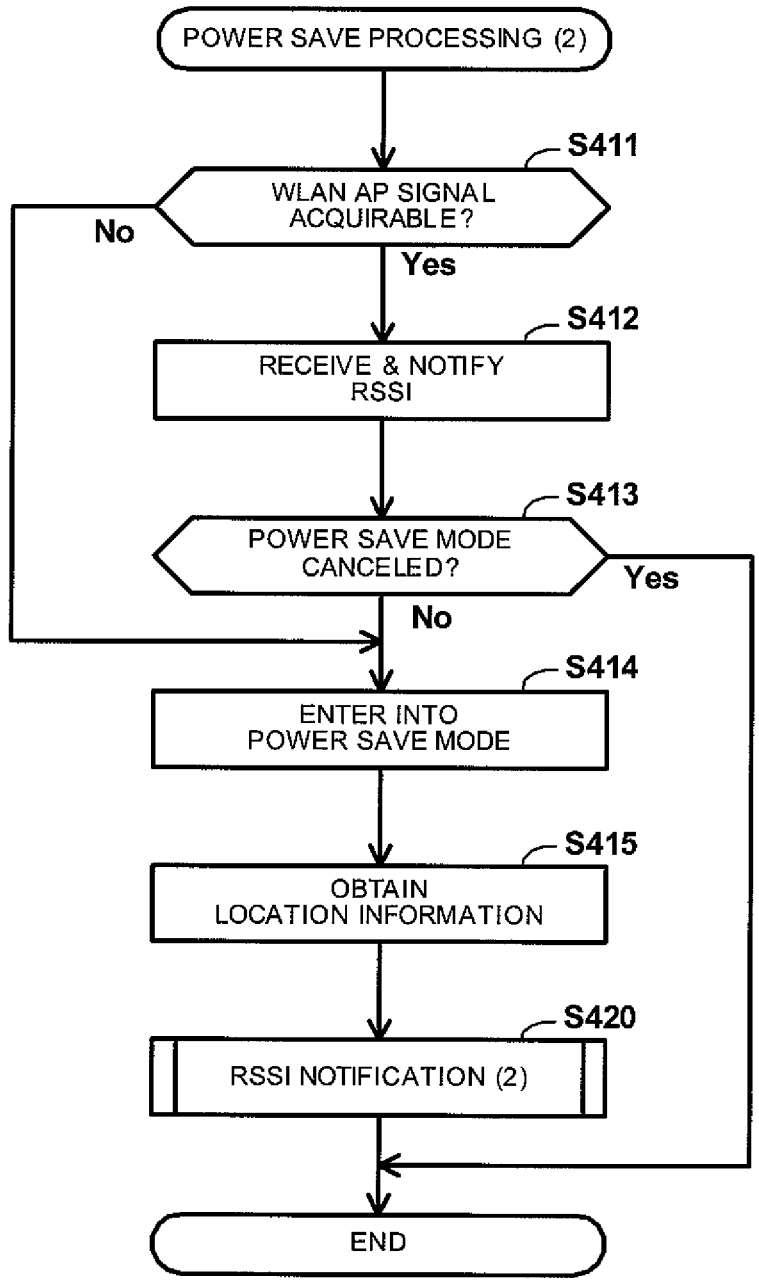
FIG. 11 is a flowchart for explaining "Power Save Processing (2)" according to a fourth embodiment of the present invention.

The "Power Save Processing (2)" to be executed by the communication terminal 100 to realize the above method will now be explained with reference to the flowchart shown in FIG. 11. This "Power Save Processing (2)" starts when the communication terminal 100 is turned on.

When the processing starts, the communication control function 112 controls the second wireless unit 132 to activate the WLAN function. If the activated WLAN function acquires signal (step S411: Yes), the communication control function 112 receives the RSSI from the signal acquired by the second wireless unit 132 and the RSSI notification function 115 outputs the acquired RSSI on the display unit 15 and the like (step S412).

In this way, RSSI notification is carried out based on the acquired signal if an access point AP is near when the communication terminal 100 is turned on.

When the user performs an operation to utilize WLAN as a result of the RSSI notification, the power save mode is cancelled (step S413: Yes). In this case, the processing ends and the processing for the WLAN operation will be executed.

On the other hand, if there is no operation to cancel the power save mode because utilization of WLAN function is not desired by the user even if the RSSI is notified (step S413: No), the power save mode is still active (step S414). In this case, the power save control function 111 controls the power unit 12 to put the second wireless unit 132 into a sleep state.

The power save mode is also active (step S414) when a signal cannot be acquired in step S411 (step S411: No). Namely, when there is no access point AP nearby when the communication terminal 100 is turned on. In this case, since WLAN communication cannot be carried out, the power save mode is activated immediately.

After the power save mode is activated, the location information processing function 113 controls the GPS unit 133 to obtain location information indicating the current location of the communication terminal 100 (step S415). The obtained location information is then stored in the storage unit 16 as the location information obtained at the time of activation.

Figure 12:
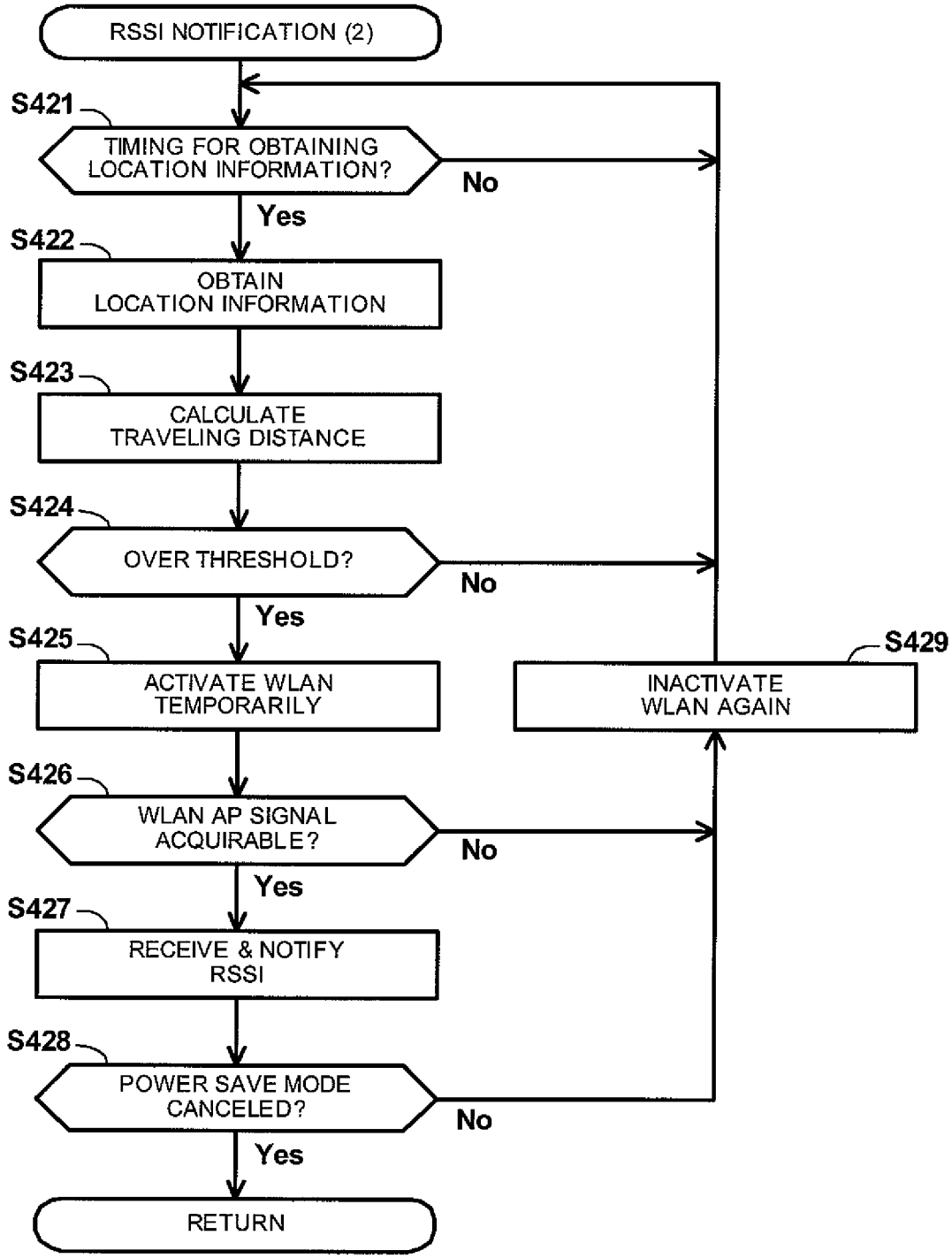
FIG. 12 is a flowchart for explaining "RSSI Notification (2)" executed in the processing shown in FIG. 11.

After the power save mode is activated in response to the activation of the communication terminal 100 and the location information at this time is obtained, the RSSI notification function 115 executes the processing of "RSSI Notification (2)" for notifying of the RSSI for the WLAN while the WLAN function is in a sleep state due to the activation of the power save mode (step S420). The "RSSI Notification (2)" will now be described with reference to the flowchart shown in FIG. 12.

In this processing, the time when the location information was obtained in step 415 of the "Power Save Processing (2)" (FIG. 11) is set as a starting point. And operations for obtaining the location information are carried out at every fixed period from the starting point (step S421: Yes, step S422), and the obtained location information is stored in the storage unit 16.

In this embodiment, two sets of the obtained location information are always stored in the storage unit 16, i.e. one is the location information obtained by the latest operation and the other is the location information obtained by the former operation just before the latest one. In the former location information, the latitude will be taken to be "$LT_{N-1}$" and the longitude will be taken to be "$LG_{N-1}$". In the latest location information, the latitude will be taken to be "$LT_N$" and the longitude will be taken to be "$LG_N$".

After such two sets of the location information are obtained, the RSSI notification function 115 calculates the traveling distance using the obtained location information (step S423) to determine whether or not the communication terminal 100 has traveled more than a prescribed threshold distance ($D_{TH}$) (step S424).

To determine whether or not the communication terminal 100 has traveled more than the distance $D_{TH}$, the RSSI notification function 115 calculates the following equation 2.

$$(LT_N-LT_{N-1})^2+(LG_N-LG_{N-1})^2 \leq (D_{TH})^2 \quad \text{Equation 2}$$

If equation 2 is satisfied, it can be determined that the traveling distance of the communication terminal 100 is only equal to the threshold distance of $D_{TH}$ or less. If equation 2 is not satisfied, it can be determined that the traveling distance of the communication terminal 100 is more than the threshold distance $D_{TH}$.

When it is determined that the communication terminal 100 has only traveled a predetermined distance $D_{TH}$ or less (step S424: No), the process flow goes back to step S421 and operations for obtaining the location information will be carried out periodically to determine whether or not the communication terminal 100 has traveled more than the distance $D_{TH}$.

On the other hand, when it is determined that the communication terminal 100 has traveled more than the distance $D_{TH}$ (step S424: Yes), the WLAN function inactivated under the power save mode is temporarily reactivated (step S425). That is, the power save control function 111 controls the power unit 12 so that power is supplied to the second wireless unit 132 and the WLAN function is activated.

At this time, it is determined whether or not it is possible to acquire the signal for the WLAN as a result of the communication control function 112 controlling the receiving operation of the second wireless unit 132 (step S426).

When there is an access point AP near the communication terminal 100 and the signal of the WLAN can be acquired (step S426: Yes), the second wireless unit 132 receives the RSSI from the acquired signal and the RSSI notification function 115 outputs the RSSI via the display unit 15 and the like, to notify the user of the RSSI for WLAN (step S427).

If the user performs an operation in order to use the WLAN function as a result of the RSSI notification, it means that an instruction is given to cancel the power save mode (step S428: Yes). In this event, this processing ends, and the process flow goes back to the "Power Save Processing (2)" (FIG. 11). The "Power Save Processing (2) will end without performing any processing, in order to execute the other processing for WLAN operations.

On the other hand, when the signal cannot be acquired even if the WLAN function is activated (step S426: No), or when there is no power save mode cancel instruction even if RSSI notification is performed (step S428: No), the power save control function 111 re-inactivates the WLAN function (step S429). In this event, the process flow goes back to step S421 to calculate traveling distance based on the location information which will be obtained periodically.

Namely, in power save mode, the traveling distance is calculated based on location information obtained every fixed period. The WLAN function is then activated temporarily every time the distance traveled by the communication terminal 100 reaches a predetermined value and an attempt is made to receive an RSSI. It is therefore possible to give notification of an RSSI for a WLAN function that is in a sleep mode even if the AP information 200 exemplified in each of the above embodiments cannot be obtained. In this case also, if the distance traveled by the communication terminal 100 does not reach a threshold, the WLAN function is kept inactive. It is therefore possible to perform RSSI notification without detriment to power savings.

In this embodiment, the traveling distance is calculated based on the differential of the latest location information and the former location information obtained just before the latest but this is by no means limiting. For example, it is also possible to calculate the traveling distance by the differential of the latest location information and former location information obtained n times before the latest. Alternatively, it is also possible to calculate the traveling distance traveled by the differential of former location information obtained n−1 times before the latest operation and later location information obtained n times before the latest operation.

As described above, by applying the present invention as described in the above embodiments, it is possible to give appropriate notification of the RSSI for inactivated wireless communication functions even during a power save operation.

The present invention is by no means limited to the above embodiments and various modifications and applications are available.

For example, in each of the above embodiments, CDMA method cellular communication was exemplified as the cellular communication carried out by the first wireless unit 131, however, applicable cellular communication method is not limited to CDMA. For example, cellular communication such as GSM (Global System Mobile Communications) or the like may be applicable.

Further, in each of the above embodiments, WLAN communication was exemplified as wireless communication carried out by the second wireless unit 132, however, applicable wireless communication is not limited to WLAN. For example, short distance wireless communication such as UWB (Ultra Wide Band) or the like may be applicable.

Further, examples are shown in each of the above embodiments of a dual mode terminal capable of utilizing a cellular communication function and a WLAN function. However, a terminal capable of utilizing three or more communication methods may be applicable to the present invention. The wireless communication units in the communication unit 13 may be extended from a first wireless communication unit to an nth wireless communication unit (n≥3). It is also possible to improve usefulness by using the method exemplified in each of the above embodiments to give RSSI notification for each of thus extended wireless communication units. In each of the above embodiments, the WLAN function is put into sleep state during power save mode. However, wireless communication function to be inactivated is not limited to WLAN function. Two or more wireless communication functions may be inactivated under the power save mode. That is, configuration for inactivation of the wireless communication functions is arbitrary.

Further, the process flows described in the above embodiments may be executed periodically based on a timer controlled by a timer control mechanism provided within the communication terminal 100. According to this structure, a period of time where the wireless communication function is in the sleep state may be longer. As a result, power consumption will be reduced more effectively.

The display screens for the RSSI shown in FIG. 7A to FIG. 7E are provided as examples. Any types of RSSI display format which enables the user to recognize whether or not communication is available, or whether the received signal state is good or not, are applicable.

In each of the above embodiments, location information for the communication terminal 100 is obtained by using the GPS function. However, means for obtaining the location information is not limited to GPS. That is, arbitrary methods may be applicable to obtain information indicating the location of the communication terminal 100.

In addition to providing a device provided with a configuration for implementing the present invention as with the communication terminal 100 shown in each of the above embodiments, it is also possible to make an existing communication terminal as a communication terminal of the present invention by applying a program.

The method for distributing the program is arbitrary. For example, the program may be distributed by a recording medium such as an optical disc or a memory card. The program may also be distributed via a communication network such as the Internet.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-282786 filed on Oct. 31, 2007 and including specification, claims, drawings and summary. The disclosure of the above Japanese Patent Application is incorporated herein by reference in its entirety.

What is claimed is:

1. A communication terminal capable of utilizing a plurality of wireless communication functions, said communication terminal comprising:
   a power save unit that performs a power save operation by inactivating at least one of the plurality of wireless communication functions;
   a location information obtaining unit that obtains location information for the communication terminal;
   a target information obtaining unit that obtains location information for an access target which is accessible by using the wireless communication function inactivated by the power save unit;
   a determining unit that determines whether the communication terminal is within a communication range of the access target based on the location information obtained by the location information obtaining unit and the location information obtained by the target information obtaining unit; and
   a notification unit that gives notification of signal strength for the inactivated wireless communication function based on determination results of the determining unit without activating the inactivated wireless communication function;
   wherein the target information obtaining unit utilizes a wireless communication function other than the inactivated wireless communication function to request an external apparatus to provide location information for the access target while informing the external apparatus of the location information for the communication terminal obtained by the location information obtaining unit such that the location information for the access target is obtained.

2. The communication terminal according to claim 1, further comprising a location information storage unit that stores location information for the access target, wherein the target information obtaining unit obtains location information for the access target from the location information storage unit.

3. The communication terminal according to claim 1, wherein the target information obtaining unit further comprising an updating unit that updates the obtained location information for the access targets based on whether communication using the wireless communication function inactivated by the power save unit is possible or not.

4. The communication terminal according to claim 3, wherein the updating unit deletes information for the access target when communication with the access target indicated in the obtained location information for the access targets is not possible.

5. The communication terminal according to claim 3, wherein the updating unit adds information for an access target when communication with an access target other than the access targets indicated in the obtained location information for the access targets is possible.

6. The communication terminal according to claim 1, further comprising a distance calculation unit that calculates a distance between the communication terminal and the access target based on the location information for the communication terminal obtained by the location information obtaining unit and the location information for the access target obtained by the target information obtaining unit, wherein the notification unit gives notification of the signal strength based on the distance calculated by the distance calculation unit.

7. A non-transitory computer-readable recording medium storing a program to be executed by a computer that controls a communication terminal capable of utilizing a plurality of wireless communication functions realizing:
   a function that performs a power save operation by inactivating at least one of the plurality of wireless communication functions;
   a function that obtains location information for the communication terminal;
   a function that uses a wireless communication function other than the inactivated wireless communication function to request an external apparatus to provide location information for an access target, while informing the external apparatus of the obtained location information for the communication terminal, in order to obtain the location information for the access target which is accessible by using the inactivated wireless communication function;
   a function that determines whether said communication terminal is within a communication range of the access target based on the obtained location information for the communication terminal and the obtained location information for the access target; and
   a function that gives notification of signal strength for the inactivated wireless communication function based on the results of the determination without activating the inactivated wireless communication function.

* * * * *